US008886858B2

(12) United States Patent
Alsford et al.

(10) Patent No.: US 8,886,858 B2
(45) Date of Patent: Nov. 11, 2014

(54) METHOD OF PROVIDING TRIM DATA FOR A FUEL INJECTION DEVICE

(75) Inventors: Henry J. Alsford, St. Albans (GB); Kevin Heaslewood, Heston (GB); Michael Leese, Oxfordshire (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 643 days.

(21) Appl. No.: 13/187,606

(22) Filed: Jul. 21, 2011

(65) Prior Publication Data

US 2012/0022766 A1 Jan. 26, 2012

(30) Foreign Application Priority Data

Jul. 22, 2010 (GB) .................................. 1012308.1

(51) Int. Cl.

| | |
|---|---|
| ***G06F 13/12*** | (2006.01) |
| ***G06F 7/00*** | (2006.01) |
| ***F02D 41/24*** | (2006.01) |
| ***F02M 65/00*** | (2006.01) |

(52) U.S. Cl.

CPC ........ *F02D 41/2467* (2013.01); *F02D 41/2435* (2013.01); *F02M 65/00* (2013.01)

USPC ............................................ 710/72; 701/103

(58) Field of Classification Search

CPC .. F02D 41/2435; F02D 41/2467; F02M 65/00

See application file for complete search history.

(56) References Cited

U.S. PATENT DOCUMENTS

| | | | | |
|---|---|---|---|---|
| 5,634,448 | A * | 6/1997 | Shinogle et al. | 123/480 |
| 6,112,720 | A | 9/2000 | Matta | |
| 6,357,420 | B1 | 3/2002 | Matta | |
| 6,360,161 | B1 * | 3/2002 | Francis et al. | 701/115 |
| 6,671,611 | B1 * | 12/2003 | Peltier | 701/104 |
| 6,775,607 | B2 * | 8/2004 | Koerner | 701/104 |
| 6,904,354 | B2 * | 6/2005 | Kuegel et al. | 701/104 |
| 6,986,646 | B2 * | 1/2006 | Bettenhausen et al. | 417/53 |
| 7,136,743 | B2 * | 11/2006 | Peltier | 701/115 |
| 7,945,374 | B2 * | 5/2011 | Keegan et al. | 701/106 |
| 2006/0041337 | A1 | 2/2006 | Augsburger et al. | |
| 2010/0145597 | A1 * | 6/2010 | Keegan et al. | 701/106 |
| 2012/0279477 | A1 * | 11/2012 | Archer et al. | 123/480 |

FOREIGN PATENT DOCUMENTS

| | | |
|---|---|---|
| DE | 101 17 809 | 10/2002 |
| DE | 10 2005 040 534 | 3/2007 |
| JP | 2003-120413 | 4/2003 |
| WO | 00/19090 | 4/2000 |

OTHER PUBLICATIONS

European Search Report dated Nov. 2, 2011.

* cited by examiner

*Primary Examiner* — Henry Tsai
*Assistant Examiner* — Jing-Yih Shyu
(74) *Attorney, Agent, or Firm* — Mark H. Svoboda

(57) ABSTRACT

A method of providing electronic trim data for a fuel injection device to an engine system, the method comprising: reading an identifier associated with the fuel injection device; accessing a database containing trim data associated with the identifier; downloading the trim data for the fuel injection device; uploading the downloaded trim data to the engine system for use in controlling fuel injection device operation.

15 Claims, 2 Drawing Sheets

METHOD OF PROVIDING TRIM DATA FOR A FUEL INJECTION DEVICE

CROSS-REFERENCE TO RELATED APPLICATION

This application claims the benefit under 35 U.S.C. §119 (a) of British Application No. 1012308.1, filed Jul. 22, 2010, the entire disclosure of which is hereby incorporated herein by reference.

FIELD OF INVENTION

The present invention relates to a method of providing trim data for a fuel injection device (such as an electronic unit injector (EUI), an electronic unit pump (EUP), a pump, smart injector, injector or any other injection device whose operation may be modified/controlled by use of trim data). In particular, the present invention provides a method of loading trim data, that accurately characterises the operation of a fuel injection device, into an electronic control unit of a vehicle.

BACKGROUND TO THE INVENTION

Electronically controlled fuel injectors are well known in the art including electronically controlled injectors that may be either hydraulically actuated or mechanically actuated. An electronically controlled fuel injector typically injects fuel into a specific engine cylinder as a function of an injection signal received from an electronic controller. Such control signals comprise waveforms that control injection rate as well as the desired timing and quantity of fuel to be injected into the cylinders.

Due to limitations in the tolerances achievable during the injector manufacturing process, each injector has its own operating nuances (e.g. fuelling and timing variations). Therefore, to achieve the desired control of the performance characteristics of the fuel injectors in a given fuel injection system such as an internal combustion engine, it is advantageous to know the operating characteristics of each injector before it is installed into the fuel injection system.

Each injector is therefore tested prior to installation and a set of trim data (e.g. valve timing offset, nozzle flow offset etc.) that can be used by the ECU to adjust for manufacturing tolerances is produced.

In order to supply the trim data set to the engine system, the trim data may be imprinted or laser etched on the injector surface as a bar-code, dot-code or 2D data matrix (hereinafter referred to as a "code region"). During assembly of the injectors into the engine, the code region may be scanned (by either a human operator or by an automated scanning system) and uploaded into the engine control unit (ECU) where the trim information is used to correct the injections.

Fuel injection equipment (FIE) trim data is traditionally compressed, encrypted and encoded before being incorporated into the code region. This method has tight limitations on the amount of data that can be stored for each injector due to the physical size constraints of the code region. For example, a Data Matrix code is a two-dimensional matrix barcode consisting of black and white "cells" or modules arranged in either a square or rectangular pattern. The usual data size of such codes is from a few bytes up to approximately 2 kilobytes. Since error correction codes are added to increase symbol strength (so that the code can be read even if partially damaged) this reduces the space available to store trim data.

The resolution of the code region, the space available to etch/imprint the code region and the customer specific requirements relating to the security of the data all limit the amount of data that can be placed within the code region. As a consequence the data is compressed heavily and a reduced number of data points only are included within the code region. For example, an injector may need to be trimmed to the nearest microsecond but the restrictions of the code region may only allow trim data every four microseconds to be stored.

One possible solution to the above issues would be to manufacture components having design tolerances that were extremely accurate. This method would essentially eliminate the need for trim data (and by association the need to monitor trim data) because the components would be essentially identical. However, although such an approach might overcome the above issues it would almost certainly be prohibitively expensive to implement.

An alternative solution would be to integrate an electronic ID chip into the injector such that the trim data may be stored in the ID chip and read by the ECU. This approach however has the disadvantage that additional circuitry often needs to be included within the engine system to allow the ECU to read the trim data from the ID chip.

It is therefore an object of the present invention to provide a method of providing trim data that overcomes or substantially mitigates the above problems.

STATEMENTS OF INVENTION

According to a first aspect of the present invention there is provided a method of providing electronic trim data for a fuel injection device to an engine system, the method comprising: reading an identifier associated with the fuel injection device; accessing a database containing trim data associated with the identifier; downloading the trim data for the fuel injection device; uploading the downloaded trim data to the engine system for use in controlling fuel injection device operation.

The present invention mitigates the problems known in the prior art by providing an identifier that is associated with the fuel injection device and which can be read and then used to locate the trim data that is relevant to the fuel injection device that is stored in a database. The relevant trim data which can be stored in uncompressed format within the database can then be downloaded from the database and uploaded to the engine control system for use in fuel injection device control. It is therefore noted that the identifier is associated with both the fuel injection device and the trim data relevant to that fuel injection device.

The fuel injector may comprise a code region within which is stored the identifier and conveniently, the reading step comprises scanning the code region on the fuel injection device in order to obtain the injector identifier. The code region may be a two dimensional matrix barcode.

In the event that a connection to the database fails or cannot be established the code region may conveniently comprise compressed trim data which can be read from the code region in addition to the identifier. The compressed trim data may be uploaded to the engine system in the event the downloading step fails. Alternatively, such compressed trim data may conveniently be used to error check the downloaded trim data received from the database.

Conveniently, the reading step may comprise scanning the fuel injection device with a barcode scanner.

Preferably, the identifier read in the reading step is sent to a computer and the accessing step comprises the computer connecting to the database.

Conveniently, the database may be located remote from the computer and a connection between the database and the computer may be established via the internet.

Preferably, the trim data that is downloaded from the database is full resolution data. Additionally, the trim data that is downloaded from the database preferably comprises trim data for a reference fuel injection device plus nominal correction data for the fuel injection device in the engine system.

The downloading step may comprise decrypting the trim data received from the database.

Preferably, the trim data downloaded in the downloading step may be uploaded to an engine control unit (ECU).

Conveniently, the identifier may be etched or imprinted onto a surface of the fuel injection device.

The fuel injection device may be an electronic unit injector (EUI), an electronic unit pump (EUP), a pump, smart injector, injector or any other injection device whose operation may be modified by use of trim data.

According to a second aspect of the present invention there is provided a system for providing electronic trim data for a fuel injection device to an engine system, the system comprising: a fuel injection device identifier reader; a computer arranged to be in communication with the reader and a network connection module for connecting to a trim data database upon receipt of the identifier from the reader wherein the computer is arranged to poll the database once a connection has been established for trim data associated with the identifier, the computer further being arranged to download the trim data from the database and to upload it to the engine system.

The invention extends to a carrier medium for carrying a computer readable code for controlling a computer to carry out the method of the first aspect of the invention.

According to a third aspect of the present invention there is provided a method of providing electronic trim data for a fuel injection device to an engine system, the method comprising: reading an identifier associated with the fuel injection device, the identifier being stored in a code region on the fuel injection device; accessing a database containing trim data associated with the identifier; downloading the trim data for the fuel injection device; uploading the downloaded trim data to the engine system for use in controlling fuel injection device operation wherein the reading step comprises scanning the code region on the fuel injection device in order to obtain the identifier and additionally comprises reading compressed trim data from the code region, the method further comprising using the compressed trim data to error check the downloaded trim data.

It is noted that preferred features of the second and third aspects of the invention are the same as the preferred features of the first aspect of the invention.

BRIEF DESCRIPTION OF THE DRAWINGS

In order that the invention may be more readily understood, reference will now be made, by way of example, to the accompanying drawings in which.

DETAILED DESCRIPTION OF THE INVENTION

In the following description the present invention is described with reference to an injector. It is however noted that the present invention may be applied to any fuel injection device, such as an electronic unit injector (EUI), an electronic unit pump (EUP), a pump, smart injector, injector or any other injection device whose operation may be modified by use of trim data.

The present invention acknowledges that the limitation of storing trim data in a code region on a fuel injection device can be mitigated by storing and retrieving the data in a different way. According to an embodiment of the present invention therefore full resolution trim data (in other words unlimited trim points and no data compression) is supplied to the ECU via an internet connection.

Figure 1:
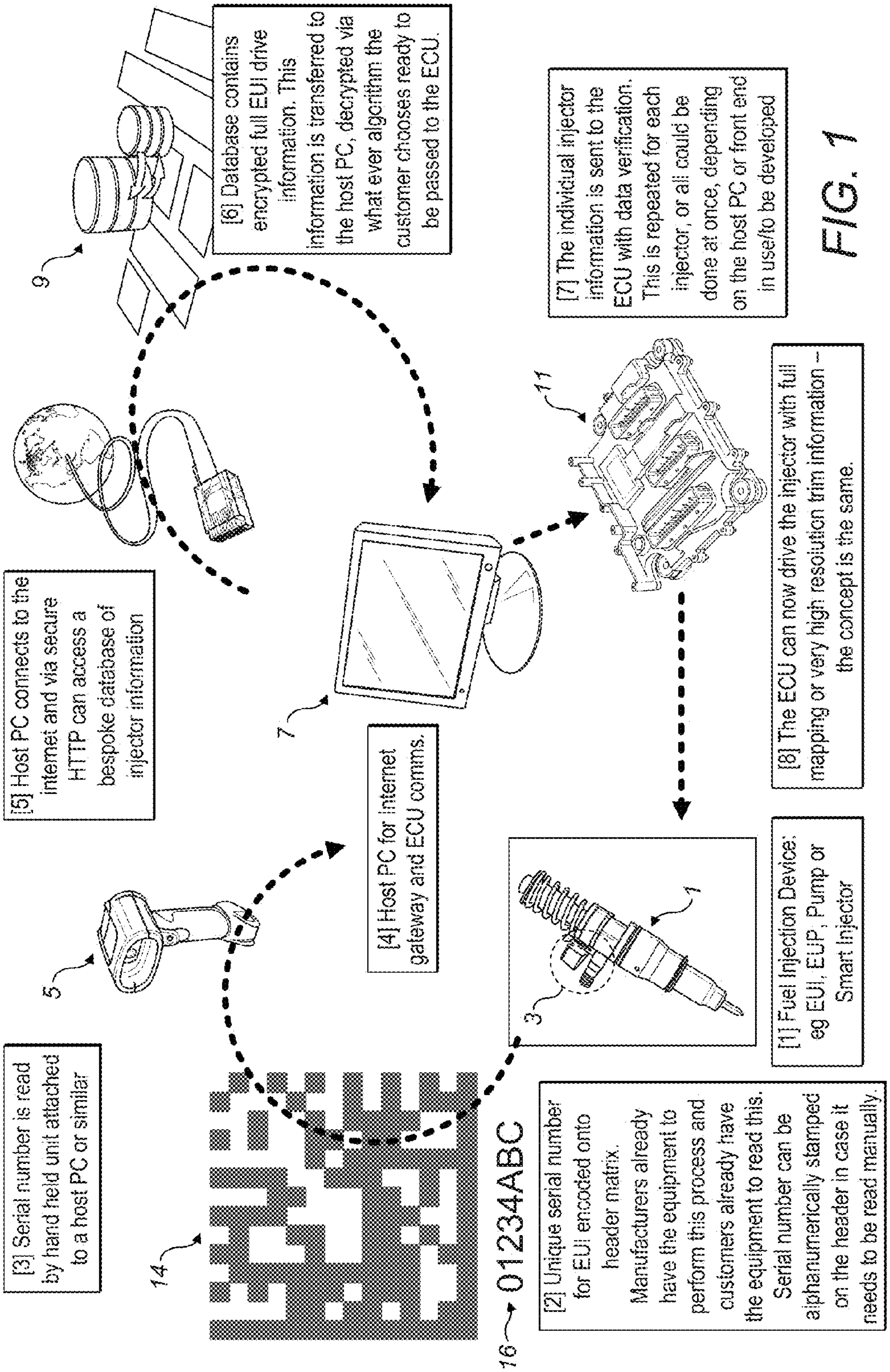
FIG. 1 shows an overview of a system according to an embodiment of the present invention.

An embodiment of the present invention is shown in FIG. 1 which illustrates an injector 1 comprising a code region 3, a code region reader 5 (“fuel injection device identifier reader”), an internet enabled computer (PC) 7, a database 9 and an electronic control unit (ECU) 11. It is noted that in the illustrated embodiment the code region 3 comprises a two dimensional bar code 14.

In the present invention the code region 3 is retained as part of the injector but instead of encoding the trim data it is used to encode a reference serial number for the injector (“an identifier associated with the fuel injection device”). A man-readable alpha-numeric version 16 of the serial number may also be included as back up in case the code region 3 is damaged or rendered unreadable in some manner.

In the prior art injector a code region reader 5 would read trim data from the code region 3 and then load this data into the ECU 11. In the embodiment according to the present invention the code region reader (e.g. a barcode scanner 5) reads the serial number of the injector and passes this to a program within the PC 7. Upon receiving the serial number, the PC 7 connects to a remote database 9 that stores trim data and downloads the data appropriate to the serial number read by the code region reader 5. The data is then loaded onto the ECU 11. It is noted that full resolution trim data may be obtained in this manner thereby retaining the full value of the injector testing and trim data.

Figure 2:
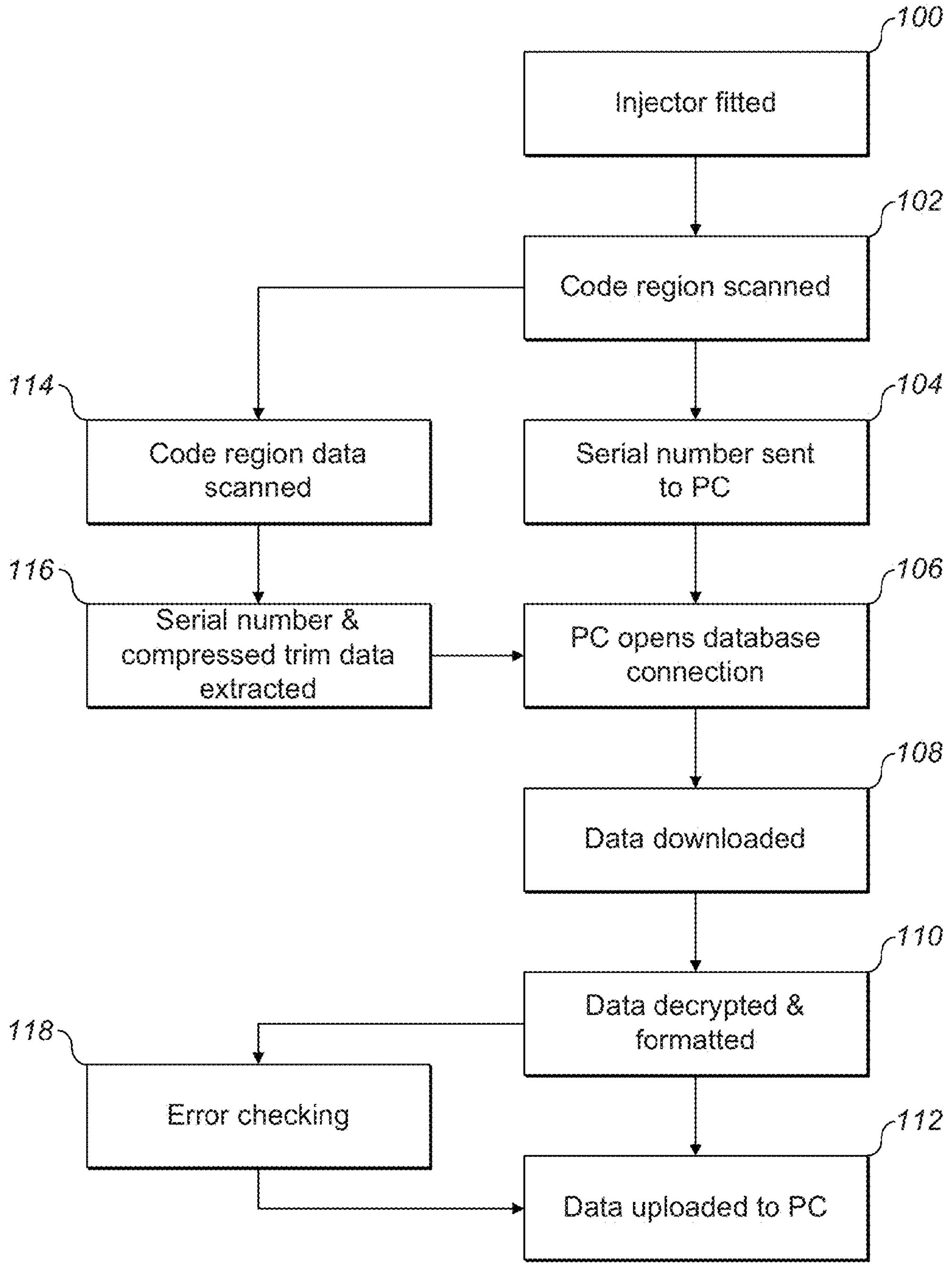
FIG. 2 is a flow chart illustrating how trim data is loaded into a vehicle ECU.

The method of accessing trim data in accordance with the embodiment of the present invention is described in more detail in relation to FIG. 2. It is noted that like numerals denote like features.

In Step 100 the injector 1 is fitted or prepared for fitting to the engine system. In Step 102 the code region 3 is scanned by the code region reader 5. In Step 104 the injector serial number from the code region 3 is passed to a host PC 7.

The PC 7 is connected to the internet (or other suitable communications network) and, in Step 106, opens a secure connection with a remote database 9 of bespoke injector information which comprises high resolution trim data for trimmed injector running.

Once a connection is established the PC 7 polls the database, in Step 108, for the relevant injector trim data and downloads this data to a data store on the PC 7. Once the data has been downloaded for all of the injectors required the connection is closed.

In Step 110, the downloaded trim data is decrypted, if necessary, and then processed into the correct format. In Step 112, a connection is then opened to the ECU 11 and the trim data uploaded.

The above method of providing trim data has the benefit that the hardware infrastructure required to access the data is largely already present in customer and service centres.

It is noted that each injector is likely to have been tested against a nominal or reference set of injector information and the variations from that nominal saved against that injector. The trim data in such cases may therefore comprise the reference set of injector information and the nominal data that specifically characterises the particular injector with reference to the reference injector.

By scanning a serial number and associating this with trim data in a database the above method has the advantage that the correct trim and nominal data are being used for a given injector.

It is noted that the PC 7 that requests the trim data from the database 9 may also be configured to output subsets of this information, e.g. in response to a customer request for injector test data.

In a variation to the above embodiment, the code region 3 may, in addition to the injector serial number, also comprise compressed trim data. For example, the code region 3 may comprise sufficient space to store trim data at a reduced resolution (compared to the full resolution data stored in the database 9). Storing a reduced data set within the code region 3 may allow trim data to be loaded into the ECU 11 in the event of a communications failure between the PC 7 and the database 9. Such a reduced data set may also allow the data received by the PC 7 from the database 9 to be checked for errors (since the data received from the database 9 should include the reduced set of data points available from the code region).

The above-described variation is illustrated in FIG. 2. In Step 102, the code region 3 is scanned as described previously. However, in this instance the process moves to Step 114 in which data comprising the serial number of the injector and the reduced resolution trim data is scanned and sent to the PC 7. In Step 116 the serial number is extracted and used by the PC 7 in Step 106 to connect to the database 9. The reduced resolution trim data is also extracted in Step 116 and stored on the PC 7 for later use.

The trim data retrieval process continues as before to Step 110 in which the downloaded data is decrypted and formatted. Before the trim data is uploaded to the ECU 11 in Step 112, however, it is checked against the stored reduced resolution trim data for any transmission errors (Step 118).

It will be understood that the embodiments described above are given by way of example only and are not intended to limit the invention, the scope of which is defined in the appended claims. It will also be understood that the embodiments described may be used individually or in combination.

The invention claimed is:

1. A method of providing electronic trim data for a fuel injection device to an engine system, the method comprising:

reading an identifier associated with the fuel injection device, the reading of the identifier comprising scanning a code region on the fuel injection device;

reading compressed trim data from the code region;

accessing a database containing trim data associated with the identifier;

attempting to download trim data for the fuel injection device;

using the compressed trim data to error check the downloaded trim data;

the method further comprising either uploading the downloaded trim data to the engine system for use in controlling fuel injection device operation in the event the downloading step succeeds or uploading the compressed trim data to the engine system for use in controlling fuel injection device operation in the event the downloading step fails;

wherein the identifier read in the reading step is sent to a computer and the accessing step comprises the computer connecting to the database.

2. The method as claimed in claim 1, wherein the code region comprises a two dimensional matrix barcode.

3. The method as claimed in claim 1, wherein the reading step comprises scanning the fuel injection device with a barcode scanner.

4. The method as claimed in claim 1, wherein the database is located remote from the computer and a connection between the database and the computer is established via the internet.

5. The method as claimed in claim 1, wherein the trim data that is downloaded from the database is full resolution data.

6. The method as claimed in claim 1, wherein the trim data that is downloaded from the database comprises trim data for a reference fuel injection device plus nominal correction data for the fuel injection device in the engine system.

7. The method as claimed in claim 1, wherein the downloading step comprises decrypting the trim data received from the database.

8. The method as claimed in claim 1, wherein the trim data downloaded in the downloading step is uploaded to an engine control unit (ECU).

9. The method as claimed in claim 1, wherein the identifier is etched or imprinted onto a surface of the fuel injection device.

10. A non-transitory computer-readable storage medium for carrying a computer readable code for controlling a computer to carry out the method of claim 1.

11. A system for providing electronic trim data for a fuel injection device to an engine system, the system comprising:

a fuel injection device identifier reader configured to scan a code region on the fuel injection device in order to obtain an identifier and to read compressed trim data from the code region;

a computer arranged to be in communication with the fuel injection device identifier reader and a network connection module for connecting to a trim data database upon receipt of the identifier from the fuel injection device identifier reader;

wherein the computer receives instructions from a computer-readable storage medium, wherein said instructions control the computer to poll the trim data database once a connection has been established for trim data associated with the identifier, wherein said instructions further control the computer to attempt to download the trim data from the trim data database and to upload it to the engine system in the event the downloading step succeeds or to upload the compressed trim data to the engine system for use in controlling fuel injection device operation in the event the downloading step fails.

12. The system as claimed in claim 11, wherein the database is located remote from the computer and a connection between the database and the computer is established via the internet.

13. A method of providing electronic trim data for a fuel injection device to an engine system, the method comprising:

reading an identifier associated with the fuel injection device, the identifier being stored in a code region on the fuel injection device;

accessing a database containing trim data associated with the identifier;

downloading the trim data for the fuel injection device;

uploading the downloaded trim data to the engine system for use in controlling fuel injection device operation wherein the reading step comprises scanning the code region on the fuel injection device in order to obtain the identifier and additionally comprises reading compressed trim data from the code region, the method further comprising using the compressed trim data to error check the downloaded trim data;

wherein the identifier read in the reading step is sent to a computer and the accessing step comprises the computer connecting to the database.

14. The method as claimed in claim 13, wherein the database is located remote from the computer and a connection between the database and the computer is established via the internet.

15. A method of providing electronic trim data for a fuel injection device to an engine system, the method comprising:

reading an identifier associated with the fuel injection device, the reading of the identifier comprising scanning a code region on the fuel injection device;

reading compressed trim data from the code region;

accessing a database containing trim data associated with the identifier;

attempting to download trim data for the fuel injection device;

using the compressed trim data to error check the downloaded trim data;

the method further comprising either uploading the downloaded trim data to the engine system for use in controlling fuel injection device operation in the event the downloading step succeeds or uploading the compressed trim data to the engine system for use in controlling fuel injection device operation in the event the downloading step fails;

wherein the identifier read in the reading step is sent to a computer and the accessing step comprises the computer connecting to the database, and wherein the database is located remote from the computer and a connection between the database and the computer is established via the internet.

* * * * *